Patented Dec. 8, 1936

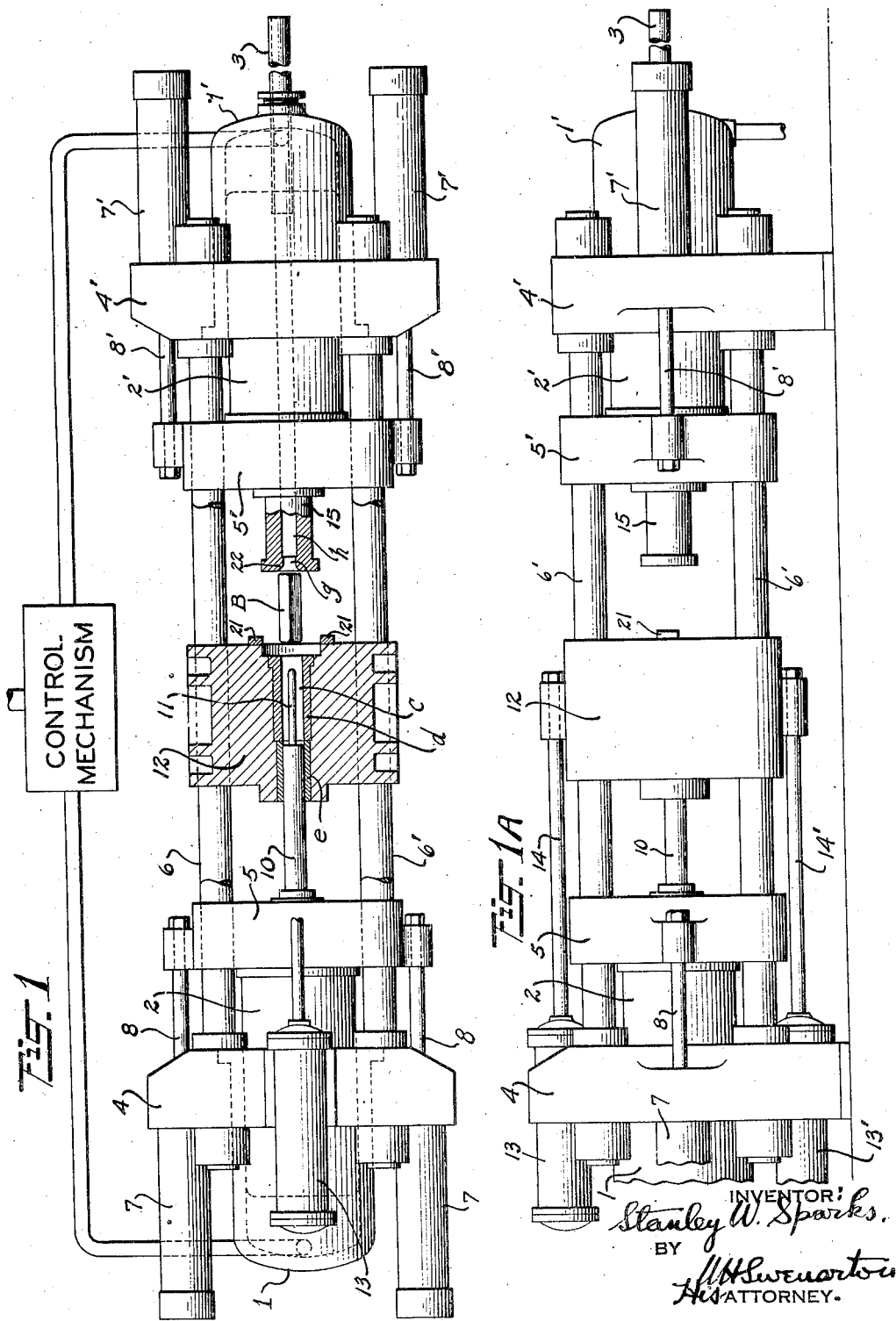

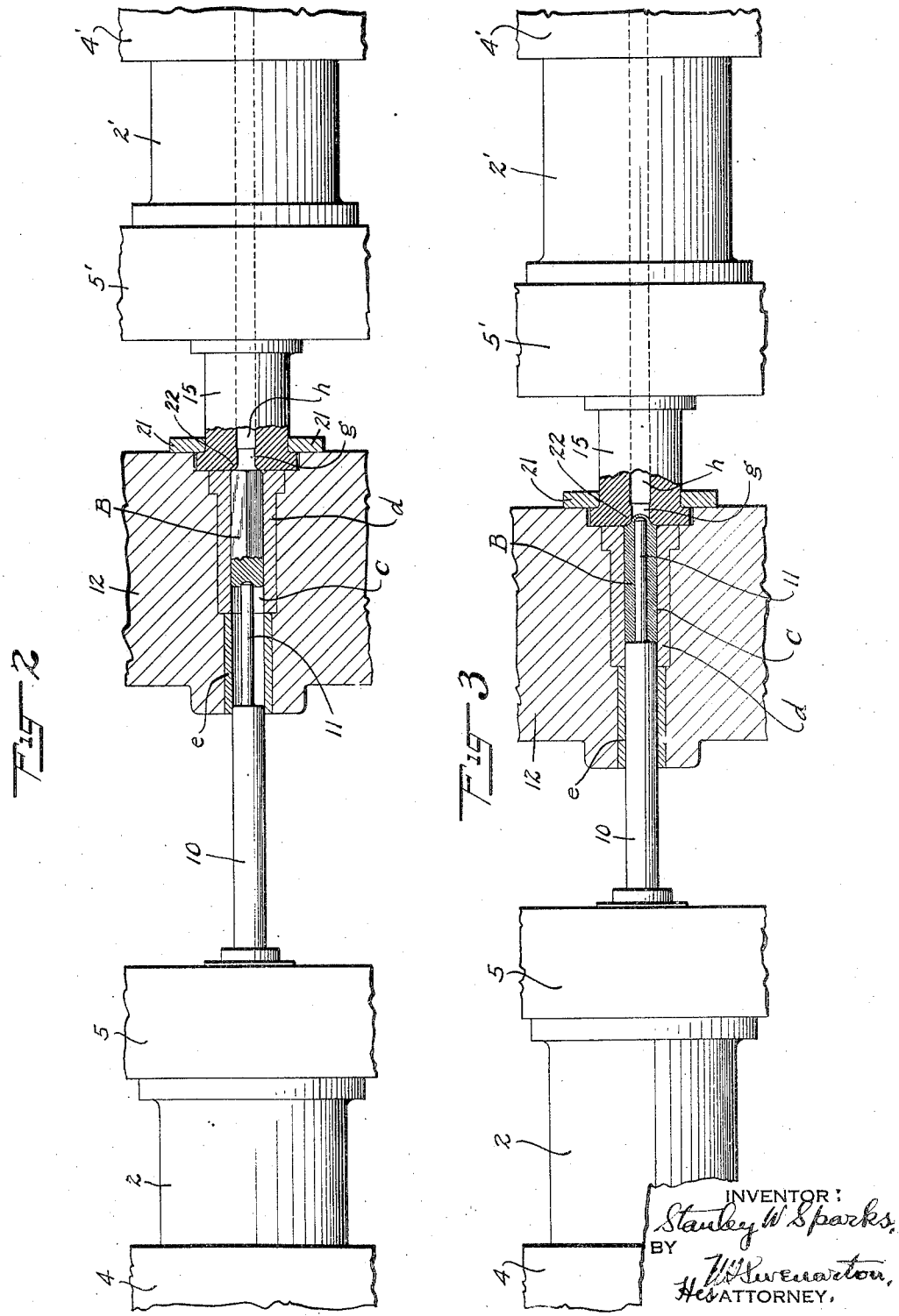

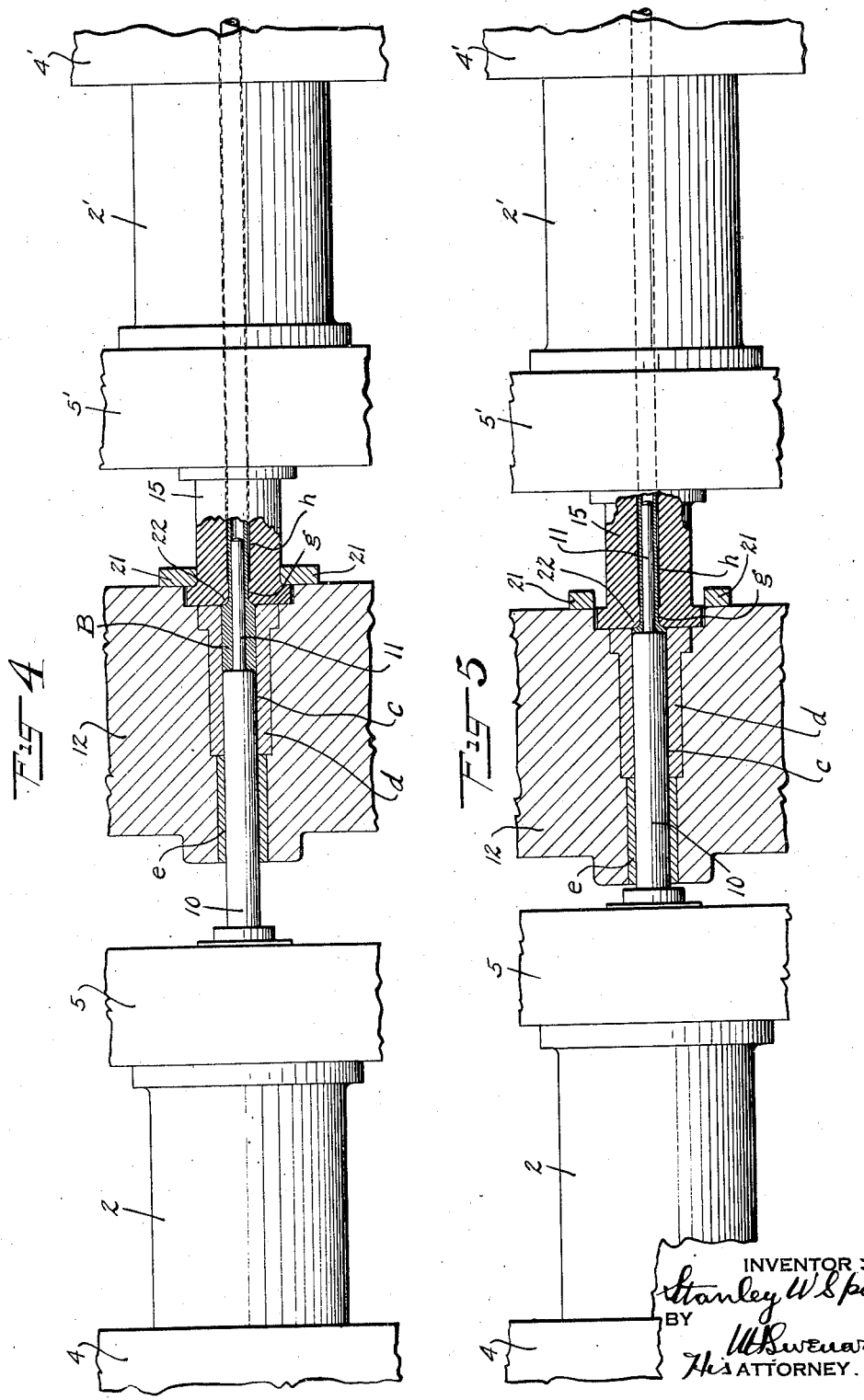

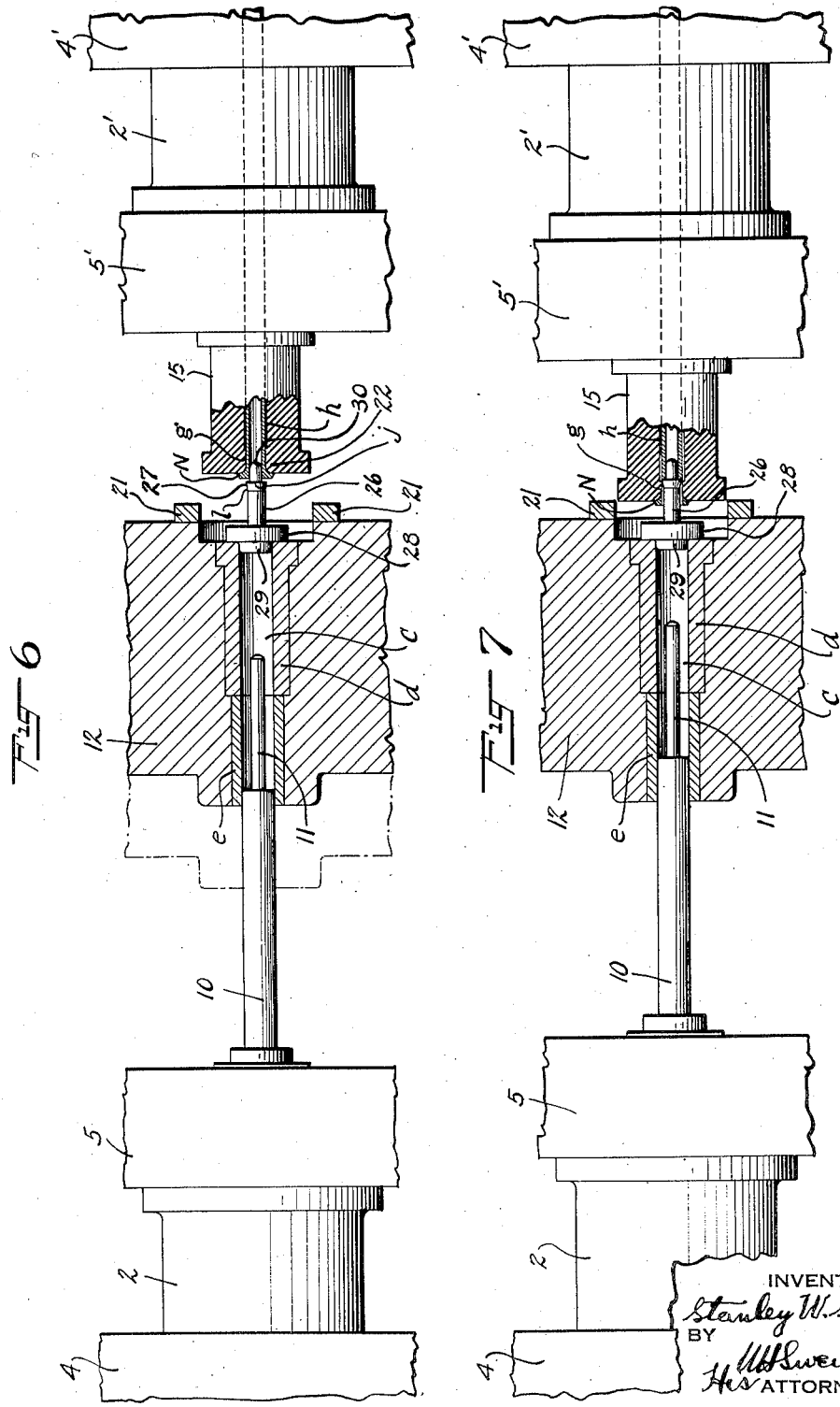

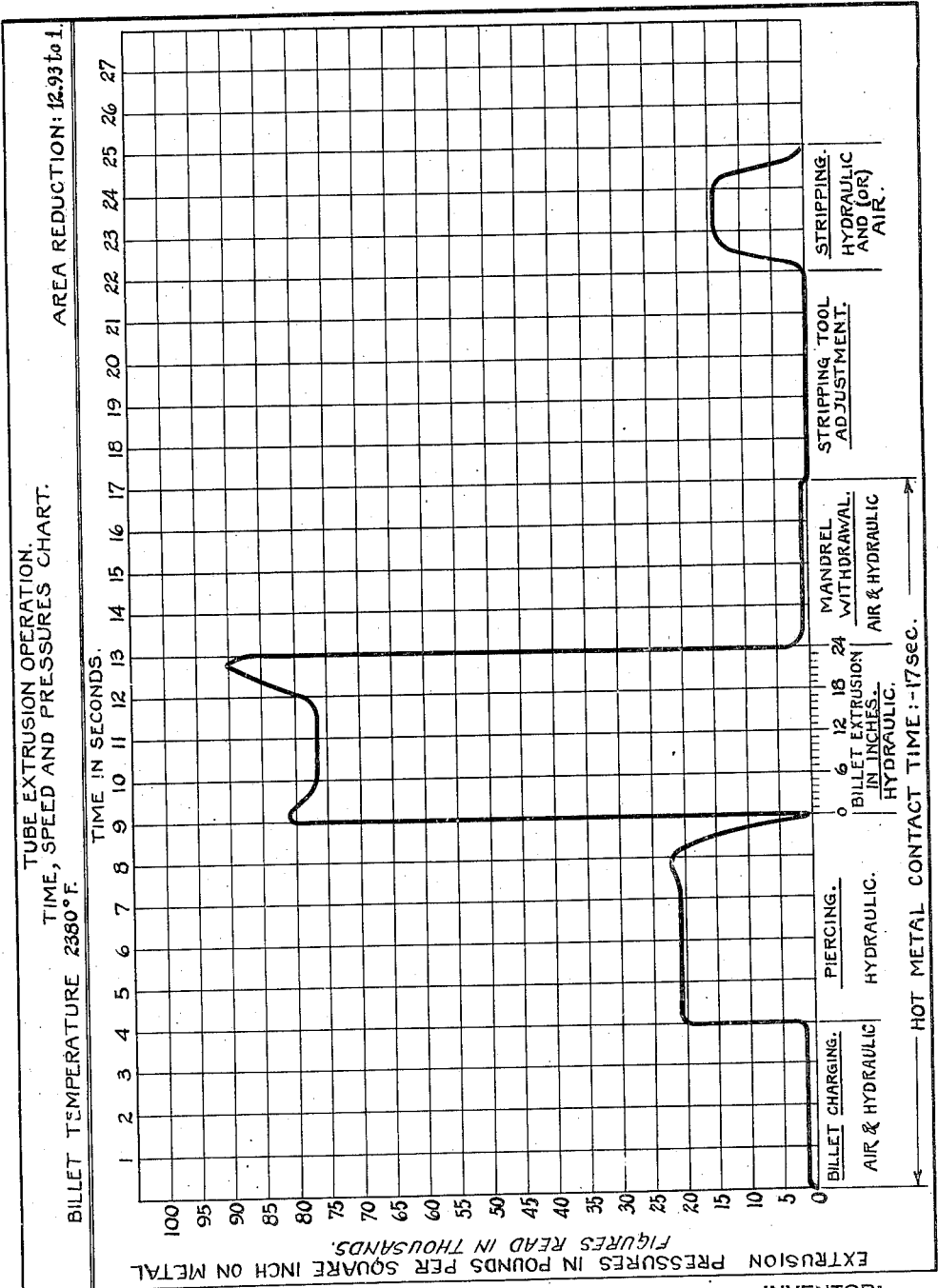

2,063,562

UNITED STATES PATENT OFFICE 2,063,562

MANUFACTURE OF EXTRUDED METAL SHAPES BY HOT HYDRAULIC EXTRUSION

Stanley W. Sparks, Norwalk, Conn., assignor to Sparks Processes, Incorporated, Norwalk, Conn., a corporation of Connecticut Application April 12, 1934, Serial No. 720,167

3 Claims. (Cl. 207—10)

This invention relates to the economical production of elongated, solid and tubular shapes of ferrous steel and alloys thereof, wrought iron and non-ferrous metals, such as copper, brass, bronze, aluminum and the like, and has for its principal objects the high speed, hot extrusion, in hydraulic press equipment, of such shapes with a minimum expenditure of power and a minimum deterioration or wear of equipment and of the dies employed, and which shapes are of greatly reduced section, as compared with that of the metal blanks processed, of smooth finish and, in the case of hollow shapes, have a dense wall section of uniform thickness and homogeneous structure. Other advantages are hereinafter set forth.

It has long been recognized in the extrusion art that rapidity of operation is a prime factor in the successful extrusion of metals and particularly of ferrous metals, since unless a high degree of plasticity of the metal can be maintained in the blank being extruded and the rapid flow of the metal through the container and die is effected, an enormous pressure is required to complete the extrusion, and consequently the wear on the die and mandrel, due to friction thereon and the deleterious effects resulting from prolonged heating thereof, is so great as to be virtually prohibitive in cost, especially if a shape of considerably reduced section as compared with the blank from which it is extruded and a shape of smooth finish is to be obtained. In an attempt to accomplish such high speed extrusion, resort has been had, as set forth in Patent No. 1,892,789, to high speed mechanical presses in which the extrusion tool was caused to move at an average of over 5″ per second, a speed which was considerably in excess of the maximum speed of extrusion tool movement in any known hydraulic press equipment. However, the enormous shock of impact of such rapidly moving extrusion tool upon the blank necessitated not only the employment of a very expensive mechanical press having heavy rugged parts, but also entails an excessively high upkeep cost due to the enormous pressures required to be suddenly exerted by such equipment upon the blank to be extruded.

The hydraulic extrusion of metals has always been a desideratum, but due to the limitations of the speed of movement of hydraulically operated plungers in the hydraulic extrusion equipment, it has heretofore not been possible to accomplish the effective and economical hydraulic extrusion of metals, and particularly long lengths of tubular shapes of smooth inside and outside finish, as well as solid shapes, with a minimum of expense for original equipment and for power and maintenance of equipment, as well as for die and mandrel wear, an attainment which can be successfully accomplished by practicing my invention.

In the accompanying drawings, I have illustrated, principally diagrammatically, the manner in which my improved hot extrusion hydraulic method is accomplished.

Figures 1 and 1A are diagrammatic plan and side views, respectively, of a duplex hydraulic press, showing the position of the parts as a billet is about to be charged into the extrusion chamber of the container;

Figs. 2 to 7 are fragmentary diagrammatic views showing the position of the moving parts immediately before the piercing operation (Fig. 2); immediately after the piercing (Fig. 3); at the middle of the extrusion operation (Fig. 4); at the end of the extrusion operation (Fig. 5); at the commencement of the stripping operation (Fig. 6); and at the completion of the stripping operation (Fig. 7);

Fig. 11 is the time, speed and pressure graph of an extrusion operation, wherein a reduction of 12.93 to 1 is accomplished and when operating upon a billet of ordinary carbon steel of about 0.30 carbon content.

Figure 8:
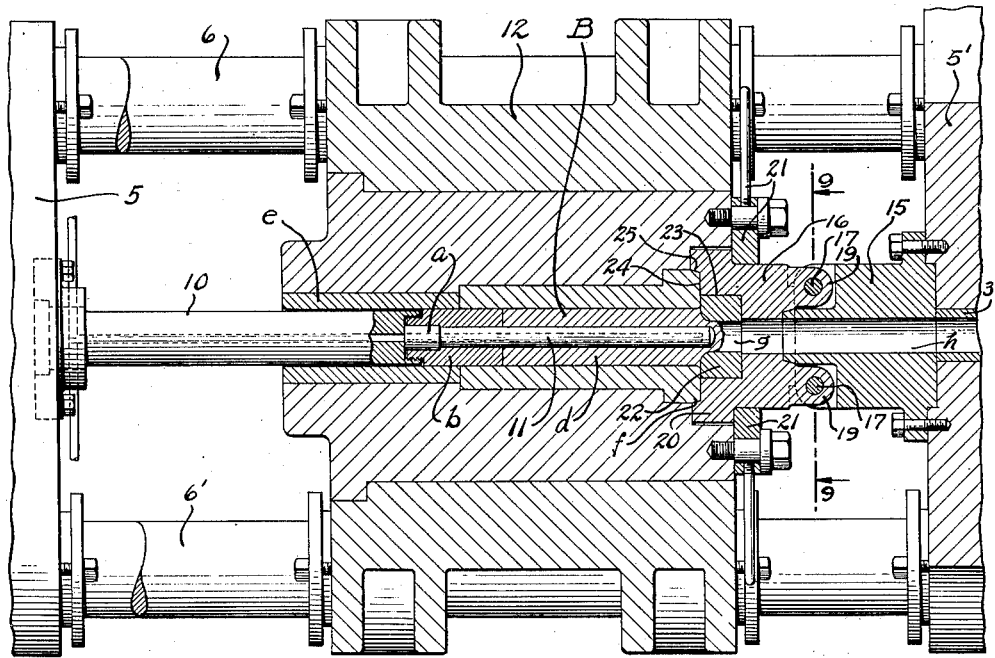
Fig. 8 is a fragmentary, detail, horizontal section, partly in plan, of the central portion of the apparatus.

Referring to the drawings and the construction shown therein, the reference numerals 1, 1' designate the main pressure cylinders of a duplex hydraulic press and 2, 2' the main plungers which reciprocate therein, said cylinders and plungers being generally of standard construction, except that the cylinder head 1' is centrally cored to receive a slidable tubular guide 3 which is secured to and moves with the plunger 2', through which the desired extruded shape is projected after the formation of the same in the die or matrix in the manner hereinafter described. Said cylinders are supported in the usual manner by stationary housings 4, 4' and said plungers 2, 2' are supported by and secured to sliding crossheads 5, 5', which latter are adapted to reciprocate on two pairs of tie rods 6, 6' that are rigidly secured to the aforesaid housings 4, 4'. A pair of hydraulic stationary draw-back cylinders 7, 7' are also carried by each of said housings 4 and 4'. Piston rods 8, 8' are secured to the pistons (not shown), which reciprocate within said draw-back cylinders, such draw-back cylinders and pistons being of the usual construction, said piston rods serving to draw-back or return the sliding cross-heads 5, 5', which latter reciprocate on said tie rods 6, 6'. A ram 10, which is carried by the cross head 5 and projects axially therefrom, is provided at its forward end with a piercer tool 11, which is employed in the production of tubular shapes but is dispensed with when it is desired to produce solid shapes the same having an inner shouldered end $a$ which serves to secure such tool between the removable nose $b$ of said ram and the ram proper when the two latter, as shown in Fig. 8, are in threaded engagement with each other, said piercer being of reduced section and conforming in cross section to the internal cross sectional area of the tube which is to be extruded in said press. A floating container 12, having a cylindrical receiver or extrusion chamber $c$, is slidably mounted on the tie rods 6, 6' and is traversed thereon by double acting air or steam cylinders 13, 13' of the usual construction, the plungers (not shown) of said cylinders being respectively connected by piston rods 14, 14' to the opposite sides of said container (see Fig. 1A). Preferably the extrusion chamber has a liner $d$ of special die steel while the rear extension of such chamber, which acts as a guide for the ram 10, may be either lined with a cheaper steel, as indicated by the reference letter $e$ or may be left unlined, since there is no possibility of erosion of the wall of that portion of the chamber, due to the flowing of hot metal thereover. The ram 10 is of course of a coss-section, such that it will have a snug, sliding fit with the liner $e$ and thereby insure against any possibility of a flash-back of the metal occurring during the extrusion operation.

A hollow pedestal 15 is axially secured to the sliding cross-head 5' and a swinging or hinged die-head or die supporting member 16 is secured to said pedestal by pins 17 which are adapted to be projected through laterally extending apertured ears 18 that are carried by said pedestal and apertured lugs 19 carried by the said die-head, respectively. The free or outer end 20 of said die-head is flanged to admit of the same being locked to the container by locking arms 21 pivotally mounted on the container when such arms are moved into the locking position shown in full lines in Fig. 9. An annular die or matrix 22 formed of suitable die-steel, is snugly fitted in a recess 23 formed in the flanged end of the die-head and a terminal recess 24, having a tapered or flared side wall 25, is formed in the die-head, the same being adapted to receive the reduced tapered end $f$ of the enlarged head of said special steel liner and thereby insure against any radial flashing of the metal between the end of the die and said head, besides centering the die.

A stripper tool 26 serves to strip the nubbin N from the extruded tube and also to eject said tube forwardly so that its rear end is freed from the rear section $g$ of the bore of the die proper 15 and projects into the enlarged bore $h$ of said die-head, which latter is of the same cross-section as the internal cross section of the guide 3. Said stripper, intermediate its ends, is enlarged to form a cutter element 27, having a cutting edge $j$ and a slightly tapered outer wall $l$, which latter serves to guide the cutter as it is withdrawn through the reduced bore $g$ of the said die after the extruded tube has been ejected beyond such reduced bore. Adjacent the rear end of the stripper is a thrust flange 28 which takes the stripping thrust imparted by the engagement of the pedestal with the container and the rear end of the stripper is enlarged to form a head 29 which co-operates with the nose 30 of the stripper to center the same in the container and in the pedestal, and thereby accurately positions the stripper during the entire stripping operation. The tube guide 3 is tightly fitted into the plunger 2' so as to reciprocate therewith and with the pedestal which, as stated, is also carried by the plunger, and said guide has a snug, sliding fit in a gland mounted in the cored head of the cylinder 1'. The internal cross-section of the guide is the same as the cross-section of the enlarged bore $h$ of the pedestal and consequently the extruded tube can be readily recovered therefrom when the extrusion is completed. A scale receptacle, comprising a slot 31 (see Fig. 9), is preferably formed in the front end of the container, the same serving to receive the scale which is scraped from the billet, particularly where a cylindrical billet is employed, as it is charged into the container 30 and thereby the tendency for scale to accumulate on the surface of the die is minimized.

Figure 9:
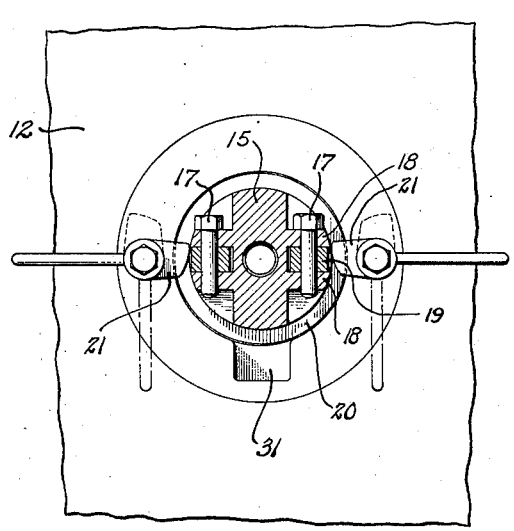
Fig. 9 is a transverse vertical section on the line 9—9 of Fig. 8.
Figure 10:
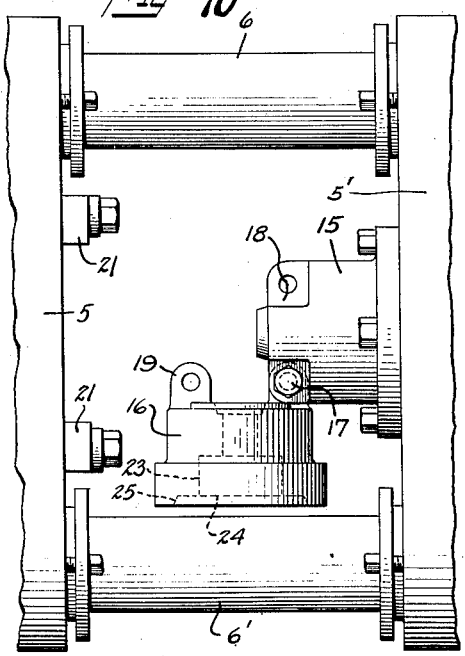
Fig. 10 is a fragmentary plan view, principally of the die pedestal and die-head or holder, showing the latter at its open position.

In carrying out my improved method of extrusion, a plastic metal billet B, either a billet of square section, as shown in Fig. 2, or a cylindrical billet, if preferred, and which billet is of an extreme transverse dimension or diameter just equal to the diameter of the receiver or extrusion chamber, is charged into the container, being positioned in the extrusion chamber thereof as shown in Fig. 2, the die head and die are positioned as in Fig. 8, the main plungers 2, 2' are advanced into the position shown in Fig. 2, and the die-head 16 is locked to the container by moving the locking arms 21 into the locking position shown in Fig. 9, in which position the same will engage the rear face of the flange 20 of said die-head and prevent relative movement between either the container and the die-head. Through a sequence of movements of the main plungers which always move in unison, but in opposite directions, the piercer tool is first caused to move from the position shown in Fig. 2 to its extreme forward piercing position, as distinguished from the extreme position assumed during the extrusion operation and as shown in Fig. 3, it all but penetrates the billet to form an unpenetrated web which projects into the mouth of the die, as shown in Fig. 3, such web serving to prevent access of air and consequently any deleterious action thereof on the interior surface of the subsequently extruded tube.

At the moment the piercer tool reaches the position shown in Fig. 3, the forward end of the ram will engage the rear of the billet, since the length of the billet which is charged into the container is such that the commencement of the extrusion occurs immediately upon the completion of the piercing operation. Thereupon, without any interruption of the movement of the plungers, the extrusion commences and the ram travels substantially completely through the container, and into the position shown in Fig. 5, while the plungers move into their extreme outermost positions, as also illustrated in the same figure. Such movement of the ram effects the substantially complete extrusion of the tube, except for the nubbin section, such tube being projected through the die orifice, thence through the die-head and pedestal and into the tubular guide carried by the plunger 2', and which slides in the head of the cylinder 1'.

Following the complete extrusion of the tube, the plungers are retracted sufficiently to admit of the insertion of a stripper tool 26 between the end of the container and the die and then the plungers are moved forward again into the position shown in Fig. 6, so that the nose or stripper tool projects into the orifice of the die and the head on the rear end thereof projects into the extrusion chamber, thus being positively centered and supported thereby. Thereupon the plungers are caused to advance into the position shown in Fig. 7, whereby the cutter element 27 on said stripper severs the nubbin N from the pipe or tube and forces the rear end of the pipe forward into the enlarged bore of the die-head (see Fig. 7), whereupon the extruded tube, freed from the nubbin, can be freely withdrawn from the tube guide 3 and recovered in the usual manner.

Suitable control means, capable of introducing and discharging water from the cylinders in such a manner as to maintain an equal pressure thereon and the synchronous movement thereof at equal speeds is provided, the same preferably being interposed in the feed and discharge lines which serve to supply and discharge the water from the respective cylinders, behind the plungers thereof. Furthermore, in constructing the cylinder 1' and its plunger 2', the same should be sufficiently over-size, as compared with the size of the cylinder 1 and plunger 2 to compensate for the area represented by the space occupied by the guide tube 3, in order that the cross-sectional area of the respective feed and discharge lines employed for two cylinders may be equal, and yet the same amount of pressure will be exerted on each of the plungers during the extrusion operation and thus a single controle mechanism only is required for controlling the movement of both cylinders.

By virtue of the fact the mandrel is projected forwardly through the container during the extrusion and its free end projects through the die orifice, the metal which is flowing through the die orifice in the same direction as the projection of the mandrel, tends to automatically maintain the latter axially of the die and thereby when a tube is extruded, the same is of unusually accurate concentricity and uniform wall thickness; for example, the permissible torelance in the seamless tube industry which is allowed for wall variation is frequently as much as 12% of the wall thickness, whereas it is possible, when employing my extrusion method wherein a floating container is employed and the die and mandrel are caused to move counter to each other, in the manner above stated, to obtain a pipe in which the wall variation in a ⅜ inch wall as less than .009 inch or less than 2½%.

As illustrated in the graph shown in Fig. 11, the first stage or billet charging operation is accomplished with both pneumatic and hydraulic pressures, but the amount of pressure is nominal; in the second or piercing stage and in the third or extrusion stage, hydraulic pressure is employed; in the fourth or mandrel withdrawal stage, hydraulic pressure is employed; in the fifth or stripping tool adjustment stage, neither pneumatic nor hydraulic pressures are employed; and in the last or stripping stage preferably, hydraulic pressure or, if desired, pneumatic pressure is employed. As shown in said graph, the complete cycle of operation requires but approximately 25 seconds and the total time of contact with the hot metal consumes but about 17 seconds. As a consequence, and especially because of the employment of hydraulic, as distinguished from mechanically applied, pressure, in the extrusion stage, the deterioration and wear upon the container liner, the mandrel and the die is reduced to a minimum and is substantially less than that which occurs in any extrusion process heretofore employed.

In the performance of my extrusion operation, the various movements of the interconnected parts of the apparatus can be accurately timed, completely synchronized and in full control of but about two operators each stationed at a different position alongside of the machine.

Among the advantages of my improved method, in addition to those above specified, are that it lends itself to the employment of a relatively inexpensive base material in contrast to the expensive electric open-hearth ingot employed in the preparation of blanks required in other well known processes of making seamless pipe and also that owing to the confinement of the blank employed in the closed die, and also because the forward end of the extruded pipe is kept sealed during the extrusion thereof, undue cooling and access of air, throughout the operation, is prevented with the consequence that the oxidation thereof and the formation of scale on the surface of the heated metal both before and during the subsequent extrusion operation, is largely inhibited or retarded so that when the high extrusion pressures are applied to the heated metal, quickly and without retardation, the metal flows through the dies along the definite flow lines thereof.

As a result of all these fundamental differences between the principles governing even one of the most modern methods of manufacturing commercial seamless tubing and my invention, it is possible through the employment of my invention, to effect a very substantial saving in the cost of material used, in the first cost for equipment and labor cost to perform the extrusion in a compact self-contained, tube extrusion machine, as compared with the cost of the equipment and operating cost of an ordinary seamless tube mill, and lastly, there is a very substantial economy in floor space and the power required to operate my extrusion machine due to the character of the operations performed, the concentration of these operations into a single heating and a single extrusion operation, as well as to the fact that the major portion of the power used directly effects the flow of the metal into the finished shape.

The advantages possessed by my improved extrusion method for the production of seamless tubing and the extruded shapes produced thereby, are quickly apparent when a comparative study is made of one of the more favorably known processes of making seamless steel tubing, known as the so-called automatic rotary or Mannesman process, which involves a complicated series of preliminary and finishing operations. In such a process an ingot is first rolled into square blooms then, in order to remove the inherent surface defects of these blooms, an expensive chipping operation is performed on the bloom before it is rolled into round lengths and cut into billets, which latter are of the same weight and cubical content as the finished tube. These billets are then reheated and subjected to a plurality of piercing, expanding, rolling, as well as other operations which require expensive mill equipment and high operating-cost machinery. Many progressive seamless steel tubing manufacturers employing this latter method resort to every known safeguard in the preparation of the material for processing, including the employment of specially prepared open-hearth or electric steel ingots, but the defects in the base material used in these processes cannot be wholly eliminated even when subjected to the most rigid inspection so that they will not appear later in the finished tube and sometimes where such defects exist on the inside of the tube the same cannot be easily detected. Furthermore, it has been impossible to produce seamless wrought iron tubes and pipe by this so-called Mannesman method, primarily because of the fact that ordinary wrought iron billets are structurally not adapted to withstand the severe strains to which the metal is subjected in the preliminary piercing and subsequent expanding and rolling operations, and as a consequence, all wrought iron pipe heretofore produced has been made by so-called lap and butt weld methods. As is evident, however, since the melting of wrought iron when in an unconfined state, instantly alters the characteristic fibrous structure of wrought iron, the weld of such pipe assumes the characteristics of mild steel and markedly differs from the structure of the balance of the pipe. Furthermore, it is commercially extremely difficult, if not entirely impracticable, to produce a wholly concentric wrought iron pipe, or even a steel pipe, by the aforesaid welding method which possesses an uniform wall dimension throughout, whereas, on the other hand, when practicing my improved extrusion method, as above stated, unusually concentric pipes of wrought iron or steel of remarkably uniform wall dimensions can be produced.

The method of and apparatus for projecting the blank, die, and container during the extrusion operation and of compressing the blank between oppositely and simultaneously moving ram and die elements are more fully disclosed and claimed in my copending application Serial No. 741,558, filed August 27, 1934.

Now, as is well known, ordinary steel contains more carbon than wrought iron, although some mild steels contain equally as little. This carbon is present largely in the form of so-called pearlite, that derives its name from its scaly or plate-like formation which gives a display of color somewhat resembling mother of pearl. Except for the presence of slag (iron silicate) and the corrosion resistance imparted thereby, wrought iron and mild or low carbon steels are almost identical in their chemical composition and physical properties. As a consequence of such close resemblance, wrought iron, as well as steel, is especially adapted for employment in my improved process for the extrusion of tubular shapes as herein set forth, since by reason of the fact that not only is the metal confined and in a plastic state during the piercing operation, but also it is possible to apply the necessary high pressure—in excess of 50,000 lbs. per square inch—and, in those cases where a large reduction is effected and long lengths of tubes or bars are extruded, even a pressure in excess of 85,000 lbs. can be applied while effecting the extrusion of the metal with sufficient rapidity—in excess of 4 in. of billet length per second—to effect the extrusion without, as previously explained, resulting in prohibitive expense for power or for wear and tear on the equipment and dies.

When wrought iron shapes are produced in accordance with my improved method, the structure is altered and the physical properties thereof, such as tensile strength, yield point, elongation and resistance to fatigue, transverse and longitudinal strengths, as well as the appearance of buffed surfaces of the same, are decidedly improved, as compared with corresponding properties and characteristics of the wrought iron billets from which such shapes are extruded. For example, a billet of wrought iron which originally had a tensile strength of about 48,000 lbs., a yield point of about 28,000 lbs., an elongation factor in 8 inches of 18% was, when extruded into a bar, improved to such an extent that it had a tensile strength of about 51,500 lbs., a yield point of about 29,250 lbs., and an elongation factor of about 25% and the reduction in area of such extruded tube when so elongated approximated 46.5%.

Furthermore, the transverse and longitudinal strengths of such bar were decidedly greater than any corresponding section of the original billet. Moreover, the original slag fibers in the billet were elongated and so-called slag inclusions were substantially eliminated in the extruded shape and and the fibers were so oriented that they arranged themselves in concentric layers in which the individual fibers were of a generally uniform, uni-directional trend, with the consequence that, in addition to the improved physical properties as above specified, the appearance of buffed surfaces of such bar, as well as of clean or buffed surfaces of sheets rolled therefrom, is noticably different to the naked eye from similar buffed surfaces of the original blank employed or of sheets rolled from similar blanks, especially insofar as concerns the generally unblemished character of such surfaces due to the absence of disfiguring blotches, such as result from so-called slag inclusions i. e., segregations of fibers which tend to alter materially the light reflection and refraction properties of such surfaces.

In the extrusion of long lengths of elongated shapes of steels and alloys thereof, the billet or blank employed is desirably heated to within 150% F. to 200% F. of the melting point, as thereby the resistance due to cooling of the metal during the operation is materially decreased, but at the same time the temperature of any blank extruded should be such that it does not unduly melt or slough and become incapable of sustaining its approximate original shape so as to interfere with the introduction of the same into the die, or to suddenly squirt out with such rapidity as to prevent its forming a perfect tube or bar in conformity either with the die, in the case of a bar, or of the die and mandrel, in the case of a tube, which are employed. In the extrusion of wrought iron, the temperature to which the billet or blank is heated is a matter of the utmost importance, since if excessively heated, not only will the production of a tube or bar of the desired conformation be impossible for the reasons above stated, but owing to the presence of slag fibers therein, the same in a typical specimen of wrought iron being approximately 2% to 2.25%, it is essential that the temperature to which the blank or billet is heated be maintained well below the sloughing temperature, and sufficiently low so that during the extrusion operation, under the high pressures employed, the tendency for the slag fibers to become displaced and segregated in masses in an extruded shape will be prevented and, on the contrary, the uniform distribution of such fibers in concentric layers in the shape in which such individual layers the fibers have a general uni-directional trend, will be accomplished, with the consequence that the structure of the extruded shape will be unusually homogeneous, both insofar as the disposition of the fibers therein are concerned and otherwise. The critical temperature to which such wrought iron is heated in order to obtain a satisfactory result should, therefore, be well below 2600° F. and desirably between 2450° F. and 2550° F., or in other words, a temperature of more than 300° below the melting point which approximates 2912° F.

In accomplishing my improved method, as is evident from the foregoing description, the extrusion speed, based on the billet length, is at the rate of double the actual speed of movement of either the die or the ram which are moving in opposition to each other. Such opposing movement of the die is of the utmost importance, in order to obtain a high speed of extrusion far beyond the limits of any commercial large size hydraulic press, for example, a speed of extrusion equivalent to 7" of billet per second in a duplex press in which the opposing plungers and the die are actually moving at a rate of 3½" per second. Moreover, by virtue of the fact that the die and the floating container are locked together and therefore do not move relative to each other during the extrusion, a peculiar squeezing action is set up which serves to materially reduce the pressure which would otherwise be required to effect the extrusion at the high rate of speed accomplished in my extrusion operation. It is particularly essential in extruding long lengths of tubing that the speed of movement of opposing plungers be in excess of 2" per second and preferably each of the same is caused to move at a speed between 3" and 3½" per second, which speeds are well within the practical limits of commercial presses which are in use, and thereby as a consequence, the billet is reduced at a rate from 6" to 7" per second, with the consequent decisive lowering of the pressure required for the extrusion operation, particularly where lengths of tubing from 20 ft. to 30 ft. are effected.

My improved extrusion operation, unlike a mechanical extrusion operation, such as disclosed in Patent No. 1,892,789, is not restricted to the employment of a billet, the length of which is not in excess of 2½ times its diameter, for the reason that unlike a mechanical press, wherein substantially all of the effective pressure is applied during the last quadrant of the stroke, my extrusion pressure is applied gradually and smoothly, the length of the stroke of each plunger being but one-half what would otherwise be required were a single plunger employed for the extrusion operation, upon a unusually long billet without impairing the efficiency in any way of the press or allowing of excessive cooling of the billet; for example, a billet say of 10" in diameter and 30 in. long is ideally adapted for extrusion by my improved method. Furthermore, owing to the smooth and gradual application of the pressure, as distinguished from the percussively applied pressures, such as utilized in the mechanical extrusion method disclosed in said Patent No. 1,892,789, a much lower initial pressure can be employed in carrying out my operation than is possible where a sudden blow is imparted to an extrusion tool. Likewise, the efficiency of the hydraulic apparatus employed in my process is materially enhanced due to the high speed of movement of the water through the supply lines, owing to the well known fact that the coefficient of friction of a moving liquid is materially reduced with an increase in speed of flow thereof.

The maintenance of the die stationary relative to the container while the same are both actually in motion, eliminates the excessive friction which would develop were it attempted to effect the telescoping movement of the container over the die during the extrusion operation, since if the fit of the die in the container is such as to prevent flashing of the metal therearound, the expansion of the die due to high compression thereof, and the high temperature to which it is subjected, will not only result in setting up excessive friction between the periphery of the die and the inner wall of the container and cause excessive wear on the outer periphery of the die and the liner of the container, but will greatly reduce the life of the die and may even frequently result in the fracture of the die or the liner of the container after but a short period of use. On the other hand, if the fit of such a die so telescoping within a container is loose enough to overcome such excessive friction being set up, such for example as the die disclosed in Patent No. 1,661,594, then a supplementary shape will be formed externally of the die due to the flashing of the metal therearound, a condition which would render the extrusion of long lengths of tubes and bars commercially entirely impracticable. Furthermore, when effecting the extrusion at the high speeds accomplished by my improved hydraulic extrusion method, owing to the high degree of plasticity thereby maintained in the billet or blank throughout the extrusion, there is no advantage to be derived from the telescoping movement of a container over the die, but on the contrary, for the reasons above explained, such movement is decidedly disadvantageous.

The expression "ramming elements" employed in the claims is used generically to refer to either the plunger elements proper of the hydraulic press or the extrusion ram carried by one of the plungers, or both of the same.

I preferably employ a plunger speed movement for each plunger of at least 3" and preferably of about 3½" per second, but not below 2" per second or in excess of 5" per second, in any event, as between these speeds 3" to 3½" per second the optimum conditions for the hydraulic extrusion prevail, and the extrusion can be effected at a rate equivalent to from 6" to 7" of billet length per second without excessively great pressures being required or without excessive wear and tear on the equipment or die and mandrel.

Various modifications within the scope of the appended claims may be made without departing from the spirit of my invention.

Having thus described my invention, what I claim and desire to obtain by United States Letters Patent is:

1. The method of hydraulically extruding ferrous metal shapes which comprises the steps of placing a heated and plastic metal blank into a container; confining the blank in the container by moving a die and a ram to the container from opposite ends thereof; locking the die in fixed relation relative to the container; and of hydraulically moving the container and related die in one direction while simultaneously hydraulically moving the ram in counter direction to concurrently compress and project the blank and to extrude metal of the blank through the die.

2. The method of hydraulically extruding a hollow ferrous metal shape which comprises the steps of locating a heated and plastic metal blank relative to a machine; confining the blank in a container, with oppositely moving die and ram elements; piercing the blank with a forming mandrel; and subsequently hydraulically moving the container, blank therein, and die in one direction while simultaneously hydraulically moving the ram and mandrel in a counter and opposed direction.

3. The method of hydraulically extruding a hollow ferrous metal shape which comprises the steps of locating a heated and plastic metal blank relative to a machine; confining the blank in a container, with oppositely moving die and ram elements; locking the die relative to the container; piercing the blank with a forming mandrel; and subsequently hydraulically moving the container, blank therein, and die in one direction while simultaneously hydraulically moving the ram and mandrel in a counter and opposed direction.

STANLEY W. SPARKS.